Dec. 1, 1959          R. G. MORK          2,915,643

LIGHT GUN ASSEMBLY

Filed June 21, 1956

INVENTOR.
RALPH G. MORK
BY
ATTORNEY

United States Patent Office 2,915,643
Patented Dec. 1, 1959

2,915,643

LIGHT GUN ASSEMBLY

Ralph G. Mork, Vestal, N.Y., assignor to International Business Machines Corporation, New York, N.Y., a corporation of New York Application June 21, 1956, Serial No. 592,905

14 Claims. (Cl. 250—217)

The present invention relates to apparatus for detecting the presence of a discrete localized phenomenon occurring in a field of reference wherein the apparatus is positioned by use of a beam of radiant energy so that the apparatus will be responsive to only an area in which the phenomenon occurs.

As a specific embodiment of the above invention concept, an apparatus is disclosed in the specification and drawings wherein the phenomenon to be detected is radiation caused by an electron burst and the radiant energy used to position the apparatus is visible energy, i.e., light. In particular, the apparatus is used to detect radiation generated by an electron burst on the face of a cathode ray tube.

While the embodiment which has been shown uses light from the localized phenomenon and light for the beam of radiant energy, the invention is not limited to this specific embodiment since other and different means may be utilized to achieve the same result. The radiant energy used for the beam could be of either a shorter or longer wave length than visible radiation. The phenomenon to be detected could also be of any wave length. The elements which make up the present apparatus find equivalents in other fields for detecting and generating radiation of a wave length other than that of the visible spectrum.

It is therefore an object of this invention to provide a novel sensing apparatus.

It is a further object of this invention to provide a sensing apparatus wherein accurate identification of the area to be sensed is provided.

It is another object of this invention to provide a sensing apparatus wherein the area to be sensed may be selectively varied.

It is a further object of this invention to provide sensing apparatus capable of distinguishing between two sources of radiation.

It is a further and more specific object of this invention to provide sensing apparatus wherein the area sensed is defined by visible radiation.

Other objects of the invention will be pointed out in the following description and claims and illustrated in the accompanying drawing, which discloses, by way of example, the principle of the invention and the best mode, which has been contemplated, of applying that principle.

In systems wherein a cathode ray tube or light producing screen is utilized to illustrate pictorially the location or characteristic of a condition, it is desirable to have means whereby some particular part of the display may be selected visually and the data producing that part determined as an entity separate and distinct from all other data.

As an example, it may be desirable to determine, for a continuously varying input function, the input data associated with a particular point as viewed on the face of a cathode ray tube.

The present invention is concerned with means for locating an illuminated area on the face of a cathode ray tube visually and determining the input data which has produced said illuminated area. In particular, this invention is applicable to a cathode ray tube display associated with a computer system wherein the electron bursts on the face of the tube are representative of digital control data which has been translated into deflection coordinate data and used to position the electron beam on the face of the tube.

Figure 1:
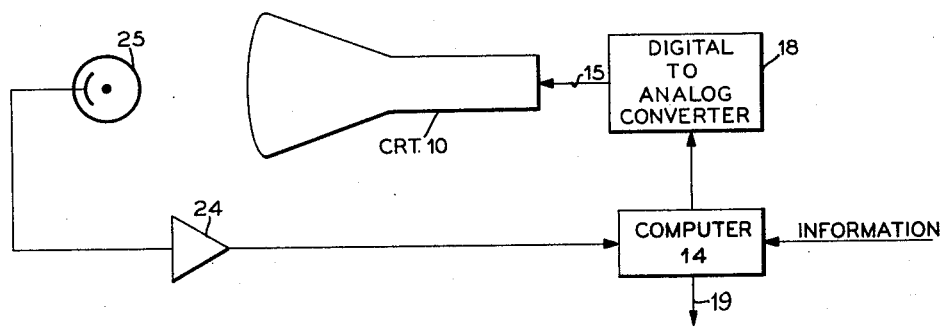
Figure 1 is a schematic showing of the use of the light sensing apparatus with a display system.

Figure 1 illustrates a system wherein an electron burst is positioned on a CRT by coordinate deflection voltages representative of digital data in the computer which it is desired to ascertain.

The computer 14 furnishes data to the digital to analog converter 18 in the form of parallel binary information which is translated into coordinate analog voltages 15 by said converter 18. These coordinate voltages position the electron beam of the CRT10 and the position of the resulting electron bursts on the face of the tube are representative of the parallel binary information. The input information to the computer may be, for example, radar coordinate data.

Since each position on the face of a CRT is related in time to the data relative to such position, it is possible to identify each electron burst on the face of a CRT with the data positioning that burst by determining the time at which the burst occurred. If the burst is detected at the instant it appears, it is obvious that the data positioning that burst would be immediately available for any use desired.

In the illustrative embodiment is a light sensitive device 25 which detects the electron bursts on the face of the CRT and develops a potential in response to each burst. This potential is transmitted to amplifier 24 which develops a square wave which is transmitted to computer 14. Since the light sensitive device has determined in time that the computer coordinate data controlling said burst is present, the computer data may be caused to take some action on the data, for example to read it out, as a separate entity from the data causing the generation of other points on the CRT display, by suitable gating circuits actuated by the pulse from device 25.

The circuits of the computer are necessarily extremely complicated and not part of the present invention so that it is not desirable or necessary to set forth the details by which the pulse from device 25 gates the digital coordinate data positioning a particular electron burst. The coordinate data at 19 will therefore be the same digital coordinate data which has been converted into analog deflection voltages and used to position the electron beam which formed the electron burst which was detected by device 25.

The operation of the apparatus shown in Figure 1 is as follows.

The light sensitive apparatus 25 is manually positioned to detect an electron burst which it is desired to identify by its digital coordinates. When the operator, with the help of apparatus to be described presently, observes that he has directed the light sensitive device 25 toward the electron burst, he depresses a trigger associated with device 25 which allows the device to transmit a pulse to computer 14 in response to the light from the burst. The pulse, when transmitted to computer 14, gates the instant digital coordinate data associated with the electron burst so that the data will appear on line 19.

The CRT face is coated with a phosphor which for proper operation in this system must be of rapid response variety. It is usually desirable, for purposes of improving the persistence of the CRT display, that a multi-layer phosphor such as one known to the trade as P7, which has two distinct layers, be used. One layer, which is responsive to the electron beam, produces a fast response blue light when excited by the electron beam, i.e., the duration of light closely matches the duration of the electron beam. This may not be suitably visible to the human eye because of the short duration so that a further coating which is responsive to the blue light is used which produces a more persistent yellow light which can be seen for several seconds. While the human eye will register the light from an electron burst whose duration is in the microsecond range, the period is too short to be very useful insofar as accurately determining the physical location of the electron burst. It is to be understood that the light given off by the yellow light producing phosphor is not constant over a long period of time and decays exponentially from a peak caused by the electron burst.

Figure 2:
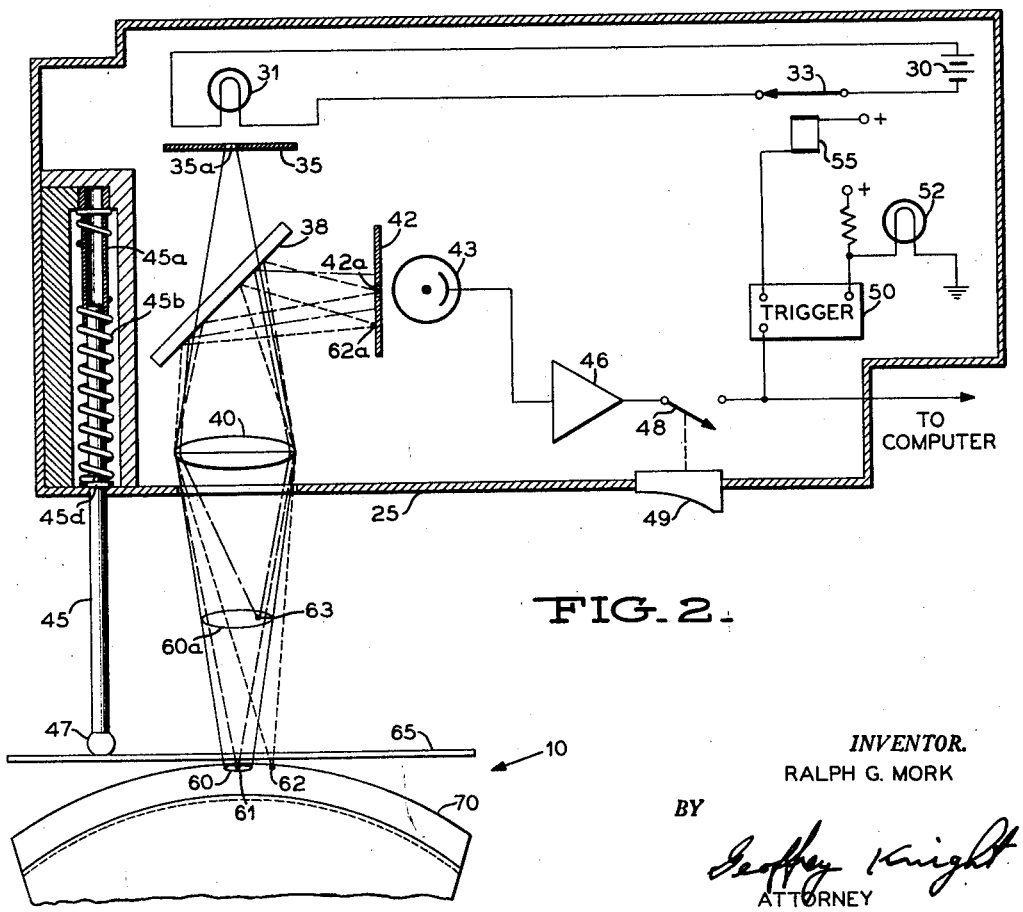
Figure 2 is a schematic view of the light sensing apparatus.

The face of the CRT is shown at 70, Figure 2. The member 65 is a transparent cover to protect operators from possible implosions of the CRT. Because of this cover 65 and because of the thickness of the CRT face plate, any electron burst will present a problem in parallax when it is desired to position a sensing apparatus in a direct line with the burst. By the use of this invention, no error because of parallax will result; the operator may hold the apparatus in any position since it is not necessary for the operator to align his eye with the device.

It will be remembered that at the instant the electron burst strikes the phosphor there will be a blue light given off by the phosphor which may last for example approximately twenty-five microseconds. While this may not be suitably visible to the human eye because of the short duration, it can be picked up by a photocell if the photocell is accurately aligned with the burst.

To align the apparatus with the burst, a source of red light 31 and the lens system 40 are used to delineate the area on the face of the CRT which will be viewed by the photocell 43. To provide the photocell 43 with an area of response which is the same as the image of red light formed on the CRT, the same optical path has been used. A dichroic mirror 38 is preferably used to separate the blue light produced by the electron burst from the red light used to position the apparatus. Dichroic mirrors have the ability to transmit one color light and to reflect another color light with high efficiency. A plain partially reflecting mirror, i.e., non-color selective beam splitter, could be used providing appropriate color selective filters are inserted so that for this example only blue light can reach the photocell and no blue light is projected by the aiming light. It is this feature which allows the same optical path to be used for positioning and detecting. Any red light from source 31 will be transmitted through the dichroic mirror while the blue light from the electron burst on the face of the CRT will be reflected to the photocell 43. The red and yellow light from the face of the CRT10 will also be transmitted through the mirror rather than to the photocell. It is of course obvious that the colors described are merely illustrative and any two colors could be used.

The red light 31 is energized by a battery 30. A plate 35 with an aperture 35a is located in close proximity to the light to form an object for the lens system 40. In accordance with the configuration of the aperture, an image is formed on CRT10 by lens system 40. The configuration of the aperture is a matter of choice and could be perpendicular intersecting lines, a bullseye, a circle, etc. For the present apparatus a circle was used and the apparatus will be described using such as an example.

The red object formed at 35a is transmitted through dichroic mirror 38 to the lens system 40 which is a convex type lens system and which will form the incident rays of light into a focused image at point 60. The lens system 40 focuses the red dot of light in accordance with the well-known optical formula $$\frac{1}{p}+\frac{1}{q}=\frac{1}{f}$$

where $p$ is the object distance and $q$ is the image distance, the distances being measured from the lens system, and $f$ being the focal length of the lens system. It is, of course, understood that the rays of light shown are merely to illustrate the boundaries of the lens system in transmitting a beam of light and that an area such as 60a will be a continuous area of red light even if not at the sharpest possible focus.

The light path length from the lens system 40 to the aperture plate 42 is the same as that from the lens system to the aperture plate 35. Considering therefore the formula $$\frac{1}{p}+\frac{1}{q}=\frac{1}{f}$$

it can be seen that since the distances involved for both aperture plates from the lens system are the same, the imaginary image of the projected aperture 35a focused on aperture plate 42 will be defined by the same boundaries as that shown for the aperture plate 35 in conjunction with the light 31 and lens system 40.

In a lens system such as 40, it is apparent that the image and object may be interchanged and the system will still be in focus. The apparatus in Figure 2 uses this principle for sensing the electron burst on the face of the tube. As previously stated, the image of red light 60 of aperture 35a and the object at 61 which is the blue electron burst are separated by the dichloric mirror. Since the red light reflected from 70 and the yellow afterglow of the blue electron burst are transmitted freely through mirror 38, these lights are limited to an optical path perpendicular to the planes of the lens system, while the blue light from the electron burst is reflected from mirror 38 to the aperture plate 42 to form an image of said electron burst.

The optical arrangement therefore comprises a first object 35a, a focusing system 40 which forms a first image 60 of the aperture 35a, and a second object at 61 which is formed into a second image on the aperture plate 42 by the focusing system 40.

It will be remembered that the operator positioned the light assembly so that a particular electron burst would be sensed. This is accomplished by orienting the projected red circle of light so as to encompass the yellow afterglow of an electron burst so that on a subsequent electron burst the blue light, which because of its duration may not be suitably visible to the human eye, may be sensed by the photocell 43 by way of dichloric mirror 38 and aperture 42a.

From a consideration of the lens system with the mirror and apertured plates, it will be apparent that the red light will determine a circle on the cathode ray tube which will serve as an area of reference. If aperture 42a is of the same size as aperture 35a, any blue object which appears within the red circle will be transmitted through the lens system through aperture 42a to the photocell 43. It is also apparent that any object outside the beam of red light will not be transmitted through the aperture 42a.

To illustrate the point in greater detail, there has been shown in Figure 2 an electron burst at 62 which does not fall within the area defined by the red light. The boundary rays of light from object 62 are focused on the aperture plate at point 62a at a point outside of aperture 42a and no image will be formed within aperture 42a to be sensed by the photocell. Similarly, for any other electron bursts outside the boundary lines of the red light there will be no light conveyed to aperture 42a so that the operator will know that the electron burst selected will be the only one which will actuate the photocell.

The focusing rod 45 is used to enable the operator quickly and accurately to achieve the sharpest focus for the red light on the CRT and to act as a steady rest. As can be seen, the rod 45 is held in an extended position by means of spring 45b and retaining element 45d which is fastened to rod 45. At the center of the CRT the sharpest focus will be with the rod extended. As the outer extremes of the CRT curve away from the mask 65, it can be seen that it is necessary to position the light sensing assembly in closer proximity to the mask to secure the sharpest focus. By pushing on the assembly the rod 45 slides into the sleeve 45a until the spot is properly registered on the tube.

It will be understood that when the apparatus is in the sharpest focus the diameter of the red spot of light will be a minimum and the area of the CRT which will be sensed will also be a minimum. Where the electron bursts on the face of the tube are in close proximity the apparatus can be accurately focused to prevent unwanted electron bursts from actuating the photocell.

Where there is no need for sharp focus, i.e., the electron bursts of interest are relatively well isolated, it is merely necessary to orient the circle of red light on the burst and any burst in the circle will actuate the photocell. As a specific example, consider the circle of light 60a to be oriented on the face of the CRT with an electron burst at 63. The boundary lines of aperture 42a would coincide with those of aperture 35a and therefore would encompass the electron burst at 63 and the blue light would be detected by the photocell.

It will be appreciated that the operator may selectively focus the light sensing assembly and cause the area sensed to be either large or small. If the electron bursts are numerous in a given vicinity, it is necessary that the gun be sharply focused while if they are further apart the assembly need not be sharply focused. Since the operator need only position the red circle of light on the electron burst to obtain an aligned image on the aperture 42a, the problem of parallax does not exist and the assembly may be held in any position.

Shown at 48 is a switch manually operated by trigger 49 which is closed by the operator when it is desired to connect the light sensing apparatus to the computer.

Connected between the switch 48 and the computer is a trigger circuit 50 which operates upon the occurrence of an output from 46 and remains operated until the switch 48 is opened. Connected to trigger 50 is a neon tube 52 and a relay 55. A suitable trigger circuit is illustrated in the patent to Krause, Patent No. 2,610,793. To make this circuit responsive to variations in output voltage from an amplifier such as 46, it would be necessary to add a resistor-capacitor coupling network to the input of the type used in coupling stages of amplification to one another.

To insure that the operator will know that a sensing operation has been completed, the tube 52 and relay 55 have been utilized. When the amplifier 46 furnishes an output and operates the trigger 50, the neon tube will glow and the switch 33 will be operated by relay 55. Switch 33 opens the circuit for the red light. Thus a dual positive indication that the electron burst has been sensed is provided. Since the trigger 50, of the type as illustrated in the Krause patent mentioned previously, is responsive to negative pulses, it will be operated by the output of the amplifier 46 when this tube is turned on by operation of the photocell 43 and in turn will be turned back off when the switch 48 is opened to drop the applied voltage to the input of the trigger circuit.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for detecting one of a plurality of discrete bursts of radiant energy comprising identifying means for continuously defining the field of response of said apparatus during a time interval within which said aparatus is being operated to detect a burst of radiant energy, said field of response being variable as a function of the distance between the apparatus and the bursts of radiant energy, and detecting means responsive to one of said discrete bursts of radiant energy, said detecting means being oriented to detect that burst which is within the field of response of said apparatus.

2. The apparatus as in claim 1 wherein said identifying means and said detecting means share the same optical path.

3. The aparatus as in claim 2 wherein said identifying means comprises a source of light and a lens system whereby the field of response is defined by the projection of said source of light through said lens system.

4. The apparatus as in claim 3 wherein said detecting means is located in a different plane than the plane in which said source of light is contained.

5. The apparatus as in claim 4, further comprising means responsive to said detecting means for de-energizing said source of light when a radiant energy burst is detected.

6. In an apparatus for detecting the presence of a discrete phenomenon comprising first means for forming a first object, focusing means positioned in proximity to said first object and operable to form a first image, a second object positioned in coincidence with said first image, said focusing means being operable to form a second image of said second obect, said first object and said second image being positioned in different planes.

7. The apparatus as in claim 6 further comprising a dichroic mirror positioned in the optical path from said first object to said lens system and in the optical path from said lens system to said second image.

8. In an apparatus for detecting the presence of a discrete localized phenomenon which may occur at different zones in a field of reference, movable means to direct a beam of radiant energy toward the field of reference, means in the field tof reference to effect two spots of radiant energy, one in response to said localized phenomenon and the other in response to the impingement of said beam of radiant energy in the field of reference, detecting means, and means positionable by said movable beam directing means to control the operation of said detecting means in dependence upon coincidence of said spots.

9. The apparatus of claim 8, wherein said beam directing means comprises a source of light and a lens system and said detecting means comprises apparatus responsive to radiant energy.

10. The apparatus of claim 9 further comprising means for separating said beam of radiant energy and the radiant energy generated by said localized phenomenon.

11. The apparatus of claim 10 wherein said means for separating comprises a dichroic mirror.

12. The apparatus of claim 11 further comprising means responsive to said detecting means for de-energizing said source of light when said detecting means responds to radiant energy.

13. In an apparatus for detecting on the face of a cathode ray tube the presence of a light spot caused by impingement of the electron beam of the cathode ray tube on said face, light detecting means, optical means for transmitting to said detecting means an image of a localized area of said face, supporting means on which said optical means is mounted, said supporting means being movable to shift said image area, and means mounted on said supporting means and movable therewith to direct a beam of light against said image area during a time interval within which said image area is being transmitted to said detecting means, to provide a visible indication of the image area.

14. Apparatus for detecting one of a plurality of discrete bursts of radiant energy comprising a source of light, a first aperture plate located adjacent said source and illuminated thereby, a lens system for forming an image of the aperture, a photocell responsive to a burst of radiant energy for generating a signal, a second aperture plate located adjacent said photocell and in proximity to said lens system and a dichroic mirror positioned between said first aperture plate and said lens system and fixed in skewed relation thereto for separating said radiant energy bursts and said source of light.

References Cited in the file of this patent

UNITED STATES PATENTS

| | | |
|---|---|---|
| 1,546,264 | Story | July 14, 1925 |
| 2,282,045 | Fleischer | May 5, 1942 |
| 2,431,575 | McCune | Nov. 25, 1947 |